(12) United States Patent
Waller et al.

(10) Patent No.: US 9,084,987 B2
(45) Date of Patent: Jul. 21, 2015

(54) METHOD FOR PRODUCING CATALYSTS AND CATALYSTS THEREOF

(71) Applicant: Yara International ASA, Oslo (NO)

(72) Inventors: David Waller, Porsgrunn (NO); David M. Brackenbury, Porsgrunn (NO)

(73) Assignee: YARA INTERNATIONAL ASA, Oslo (NO)

( * ) Notice: Subject to any disclaimer, the term of this patent is extended or adjusted under 35 U.S.C. 154(b) by 146 days.

(21) Appl. No.: 13/864,541

(22) Filed: Apr. 17, 2013

(65) Prior Publication Data

US 2013/0231241 A1    Sep. 5, 2013

Related U.S. Application Data

(63) Continuation of application No. 12/601,644, filed as application No. PCT/NO2008/000258 on Jul. 4, 2008, now abandoned.

(30) Foreign Application Priority Data

Jul. 4, 2007   (NO) .................................. 20073460

(51) Int. Cl.
  *B01J 23/83*   (2006.01)
  *B01J 20/30*   (2006.01)
  (Continued)

(52) U.S. Cl.
  CPC .............. *B01J 23/83* (2013.01); *B01J 20/3007* (2013.01); *B01J 35/0006* (2013.01); *B01J 35/04* (2013.01);
  (Continued)

(58) Field of Classification Search
  CPC ........ B01J 23/75; B01J 23/83; B01J 37/0009; B01J 37/0045; B01J 37/0018; B01J 37/0036; B01J 37/088; B01J 23/005; B01J 35/0006; B01J 35/04; C04B 35/50; C04B 35/632; C04B 35/62886; C04B 35/62813; C04B 2235/3275; C04B 2235/3229; C04B 2235/449; C04B 2235/6022; C04B 2235/3217
  USPC ....................... 502/100, 172, 304; 264/5, 604
  IPC .................................. B01J 23/10, 23/75, 31/04
  See application file for complete search history.

(56) References Cited

U.S. PATENT DOCUMENTS 3,489,208 A    1/1970   Manteufel
3,823,002 A    7/1974   Kirby, Jr. et al.
(Continued)

FOREIGN PATENT DOCUMENTS

CN    1778760    5/2006
EP    0 294 305    12/1988
(Continued)

OTHER PUBLICATIONS

International Search Report issued Nov. 11, 2008 in International (PCT) Application No. PCT/NO2008/000258.
(Continued)

*Primary Examiner* — Jun Li
(74) *Attorney, Agent, or Firm* — Wenderoth, Lind & Ponack, L.L.P.

(57) ABSTRACT

The invention relates to a process to produce catalysts by powder injection molding and the catalysts thereof, wherein the catalysts are made by preparing a ceramic formulation with temperature controlled rheological properties comprising catalytic components, heating the powder formulation up to at least the fluid state transition temperature, shaping a sample by injecting the fluid powder formulation into an injection mold followed by cooling the injected powder formulation below the fluid state transition temperature, debinding the shaped sample, and sintering the shaped sample to form a ceramic catalyst. Alternatively the ceramic structure may be formed initially followed by a coating of the ceramic structure by one or more catalytic compounds.

27 Claims, 12 Drawing Sheets

5A     5B

5C

(51) Int. Cl.
  *B01J 35/00* (2006.01)
  *B01J 35/04* (2006.01)
  *B01J 37/00* (2006.01)
  *B01J 37/08* (2006.01)
  *B28B 1/24* (2006.01)
  *B28B 7/18* (2006.01)
  *C04B 35/50* (2006.01)
  *C04B 35/628* (2006.01)
  *C04B 35/632* (2006.01)
  *B01J 23/00* (2006.01)
  *B01J 23/75* (2006.01)

(52) U.S. Cl.
  CPC .......... *B01J 37/0009* (2013.01); *B01J 37/0018* (2013.01); *B01J 37/0036* (2013.01); *B01J 37/0045* (2013.01); *B01J 37/088* (2013.01); *B28B 1/24* (2013.01); *B28B 7/18* (2013.01); *C04B 35/50* (2013.01); *C04B 35/62813* (2013.01); *C04B 35/62886* (2013.01); *C04B 35/632* (2013.01); *B01J 23/005* (2013.01); *B01J 23/75* (2013.01); *C04B 2235/3217* (2013.01); *C04B 2235/3229* (2013.01); *C04B 2235/3275* (2013.01); *C04B 2235/449* (2013.01); *C04B 2235/6022* (2013.01); *Y02C 20/10* (2013.01)

(56) References Cited

U.S. PATENT DOCUMENTS

| | | | |
|---|---|---|---|
| 4,743,578 A | 5/1988 | Davidson | |
| 4,837,187 A | 6/1989 | Frank et al. | |
| 5,935,896 A | 8/1999 | Dupuis et al. | |
| 5,972,254 A | 10/1999 | Sander | |
| 6,019,935 A * | 2/2000 | Eckardt et al. | ................ 264/572 |
| 6,299,958 B1 | 10/2001 | St. Julien et al. | |
| 6,328,915 B1 | 12/2001 | Sander | |
| 2001/0033817 A1 | 10/2001 | Sander | |
| 2002/0068005 A1 | 6/2002 | Meinhardt et al. | |
| 2003/0100448 A1 | 5/2003 | Cutler et al. | |
| 2006/0216467 A1 | 9/2006 | Yoshida | |
| 2007/0120493 A1 | 5/2007 | Tambini et al. | |
| 2007/0238256 A1 | 10/2007 | Fischer et al. | |
| 2008/0190083 A1 | 8/2008 | Oshimi | |

FOREIGN PATENT DOCUMENTS

| | | |
|---|---|---|
| EP | 0 459 396 | 12/1991 |
| EP | 1 961 930 | 8/2008 |
| GB | 2 432 713 | 5/2007 |
| JP | 11-82005 | 3/1999 |
| JP | 11-92803 | 4/1999 |
| WO | 2006/009453 | 1/2006 |
| WO | 2007/126710 | 11/2007 |

OTHER PUBLICATIONS

Norwegian Search Report issued Jan. 24, 2008 in European Patent Application No. 20073460.
Patent Cooperation Treaty (PCT) International Preliminary Report on Patentability issued Oct. 20, 2009 in International (PCT) Application No. PCT/NO2008/000258.
Written Opinion of the International Search Authority issued Nov. 11, 2008 in International (PCT) Application No. PCT/NO2008/000258.
Response to Written Opinion in International (PCT) Application No. PCT/NO2008/000258.
English translation of Tanaka (JP 11-082005), 1999.

* cited by examiner

1A

1B

1C

1D

Voidage = 59%
Wall thickness = 0,70mm
Channel size = 2,37mm

5A

Voidage = 48%
Wall thickness = 0,61mm
Channel size = 1,38mm

5B

5C

Fig. 11    CFD Calculations of pressure drop across Injection Moulded Monolith variants (pressure drop in Pa)
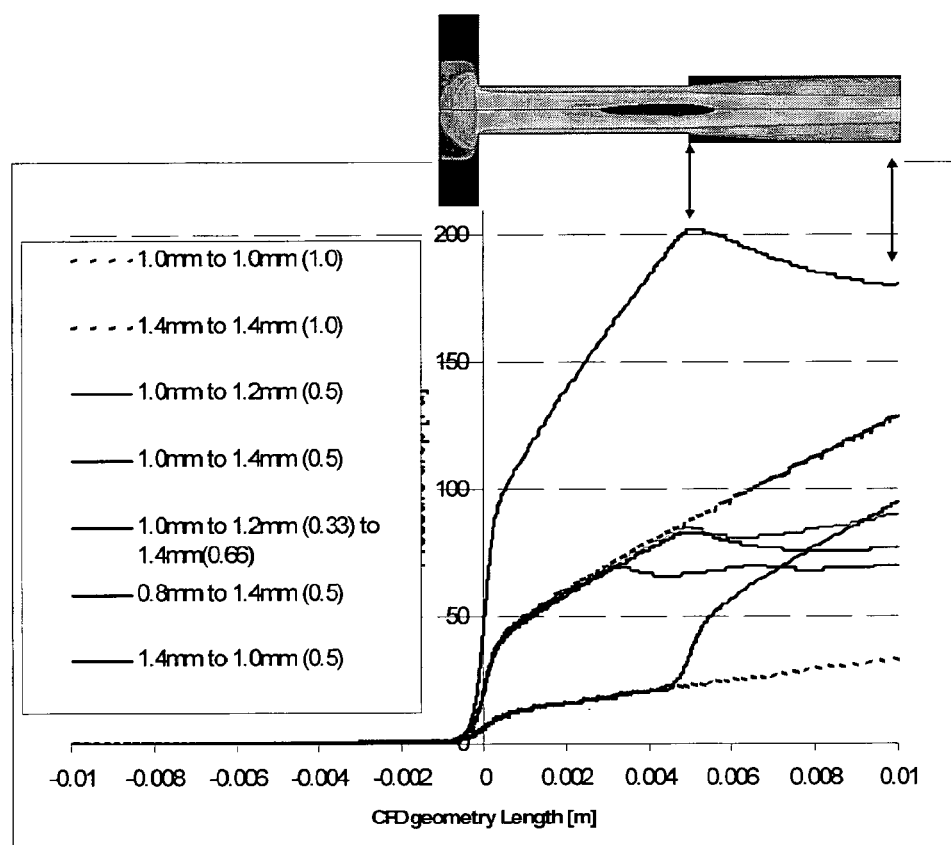

Figure 12   Geometry of example embodiment of monolith according to the invention.
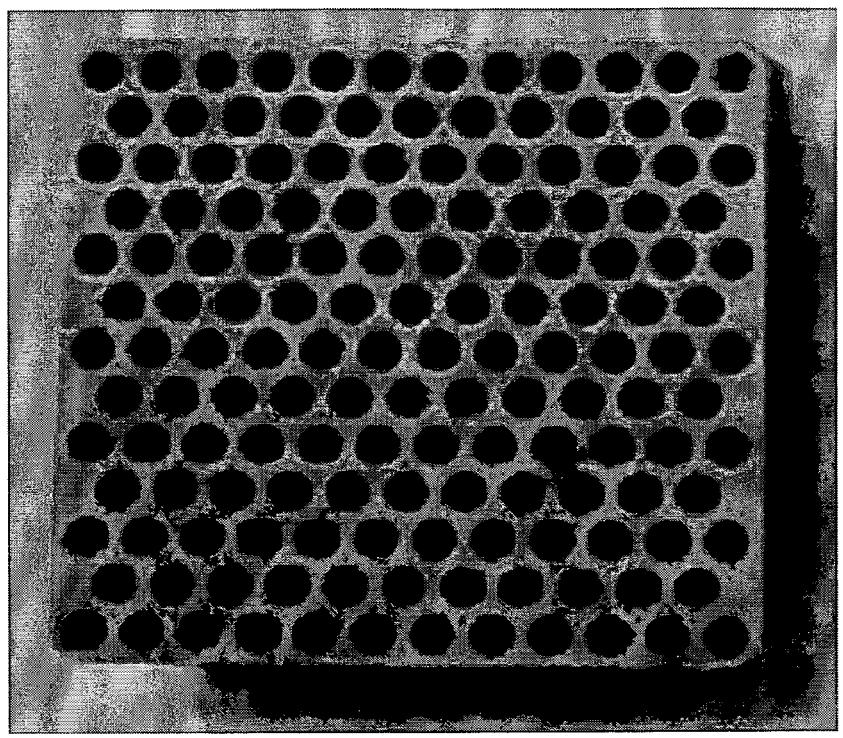

Fig. 13    Geometry of stepped-channel monolith catalyst.
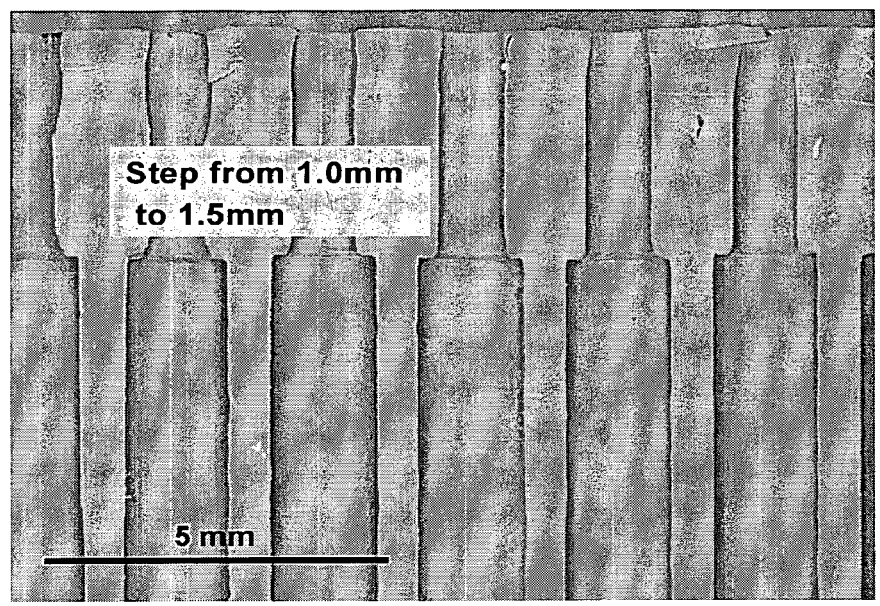

Fig. 14. N₂O conversion over straight and stepped-channel monoliths
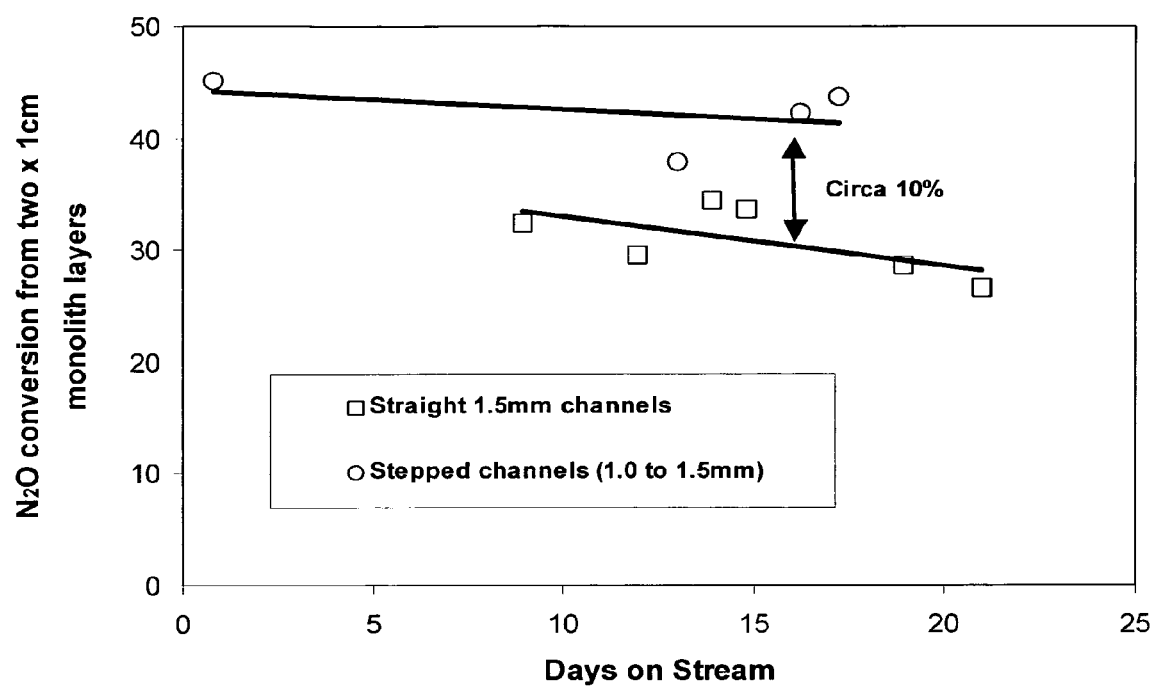

METHOD FOR PRODUCING CATALYSTS AND CATALYSTS THEREOF

The invention relates to a cost effective method for manufacturing solid ceramic catalysts with enhanced catalytic performances, and catalyst thereof.

BACKGROUND

Ceramic catalysts may be employed to induce/increase a range of different chemical reactions such as synthesis of organic and inorganic compounds, decomposition of oxides, oxidation of compounds etc. One example of use of ceramic catalysts are in de-nitrification of exhaust/flue gases. Nitrogen oxides are unwanted bi-products often formed in combustion processes and other chemical reactions involving nitrogen and oxygen at high temperatures. Many of these oxides have detrimental effects on the environment. For example, $N_2O$ is a very strong greenhouse gas, and the Kyoto Protocol calls for strong reductions in the emissions of the gas. NO and $NO_2$ are strong acidic oxides forming nitric acid when reacting with water, and is a major source for acidic rain. Nitrogen oxides may be catalytically reduced to elementary nitrogen and oxygen by use of specific classes of ceramic catalysts.

The catalytic active compound in ceramic catalysts may be the ceramic compound themselves, or the catalytic activity may be provided by compounds added to the ceramics, either in form of a composite in the ceramic matrix or of a coating on the ceramic solids.

Ceramic catalysts may advantageously have a plurality of through-going channels in order to increase the surface area of the catalysts. These channels are usually oriented in parallel inside each solid catalyst, and the catalyst body is usually given a cylindrical shape with non-circular cross section, that is, the catalyst object is an elongated object with an n-fold rotational symmetry along its centre axis. The catalysts may also be given a complementary form (not necessarily with n-fold rotational symmetry) such that they may be adjoined to form a planar inter-locking structure with the internal channels oriented normal to the surface plane of the structure in order to force passing fluids to flow through the channels. The physical dimensions of the planar inter-locked structure may be designed to cover the entire cross section of a reactor in order to force all fluids flowing through the reactor to pass through the channels in the catalyst.

Solid ceramic catalysts with the form of cylinders with or without circular cross sections and which incorporate a plurality of through-going channels in parallel with the centre axis are often denoted monoliths in the literature and industry. These structures are usually either coated with a catalytically active layer or are actually produced from the catalyst itself (S. Irandoust and B. Andersson, Catal. Rev.-Sci. Eng, 30, 341-392 (1988), "Monolithic catalysts for non-automobile applications", and A, Cybulski and J. A. Moulin, Catal. Rev.-Sci. Eng, 36, 179-270, (1994), "Monoliths in heterogeneous catalysis"). Monoliths are usually given a complementary shape and orderly placed side by side with their channels directed along the flow direction in the reactor such that the monoliths completely cover the cross-sectional area of the reactor. Thus the gas flowing in the reactor is made to enter the channels and passing through them.

Relatively small (as compared to monoliths) pellet-like ceramic catalysts with internal channels are often denoted "miniliths" in the literature and industry. These catalysts may be given any shape and are usually placed in random order in a layer covering the cross-section of the reactors. The direction of the internal channels in the catalysts will thus become stochastic, and the main catalytic effect is obtained by forcing the reactant fluids to flow through the layer of miniliths in-between the miniliths. Only a fraction of the reactant flow will enter and pass through the internal channels.

The catalytic activity of a solid catalyst is usually a function of amount of catalyst material and the contact area of the solid. As a general rule, the catalytic activity is controlled by the amount (mass) of the catalytic components when dealing with reactions with relatively slow chemical reaction rates, and by surface area when dealing with relatively rapid chemical reaction rates. The fast reactions occurs predominantly on the surface of the catalyst since the reactants becomes reacted before they are able to diffuse into the bulk phase of the catalyst, and is thus a surface controlled process. The slower chemical reactions allow time to involve the bulk phase of the catalysts and thus become more bulk phase (i.e. mass) controlled process.

The ratio of amount of catalyst mass and surface area is a function of number and dimensions of the through-going channels, i.e. the voidage fraction becomes a measure of the catalytic activity of the ceramic catalyst. Catalysts intended for mass controlled reactions should have voidage fractions in the range from about 30% to 50%, while catalysts intended for surface controlled reactions should have voidage fractions from about 60 to 90%.

PRIOR ART

Present ceramic monolith catalysts intended for surface controlled reactions, such as catalytic combustion, are made by extrusion of a ceramic paste. However, with extrusion, pastes in which the rheology is controlled by shear stress, are used. The low viscosity required to allow the paste to flow through the die is generated by the shear tinning nature of the paste i.e. the application of shear stress to the paste as the paste enters and passes through the die leads to the necessary reduction in paste viscosity. When the paste exits the extrusion die, the shear stress is relaxed and the viscosity of the paste increases. Generating the shear stresses for this reversible rheological process becomes problematic when extruding monoliths with small channels and thick walls as sufficiently high shear stress can not be generated. Therefore, it is presently not practical to extrude monolith catalysts with voidage fractions below 50%. Thus conventional monolithic catalysts, due to their high voidage (>60%) are not ideal for processes that have rates that are low enough, such that they are significantly limited by bulk processes.

It is known to make miniliths by dry compaction of a powder in a die. The miniliths may be given through-going channels by equipping the dies with a number of core pins. However, this technology does not allow forming objects larger than the pellet-like miniliths.

The presently preferred manufacturing method for making larger ceramic catalysts, or monoliths, is extrusion. Extrusion is a method where a plastic mix, consisting of the catalyst, binders, processing aids and a solvent is pressed through a die to generate a solid block. The block may contain a multiplicity of channels, produced by die core pins. Extrusion is very suitable for producing long blocks of material with straight parallel channels. The total processing time may take up to five to six days, as the extruded block will require careful, drying and thermal treatment. Sophisticated drying procedures, such as microwave drying, may be able to reduce this processing time a little, but the large process time is nevertheless a problem since it enhances the manufacturing costs.

Another problem with extrusion is that the method only allows forming objects with constant cross-sections along the centre axis. No variation of the channel diameter or shape may be formed, leading to stable laminar flow regimes in the channels. This is a problem since it is known that turbulent flow increases the contact between the gas (reactants) and the catalyst(s) of the channel walls, and thus enhances the catalytic activity. Thus monoliths should be able to provide turbulent flow regimes in their channels.

One known approach for obtaining turbulent flow in monoliths is to cut a monolith into shorter segments and place them in stacks. In entering a new short segment, turbulent flow is regenerated. This was demonstrated by Wendland for conversion of carbon monoxide and hydrocarbons (D. W. Wendland Transactions of the American Society of Mechanical Engineering, 102, 194 (1980)). Similarly Doory et al showed that the conversion was increased from 50% to 90% by using a cut, segmented monolith compared to un-segmented monolith (L. D. Doory, B. E. Said, U. Ullah and S. P. Waldram, I. Chem. Symp. Series 121, 425-429 (1990) and L. D. Doory, B. E. Said, U. Ullah and S. P. Waldram, Tran. I. Chem. E. 69, Part A, 203 to 204 (1991)).

Unfortunately, segmenting by cutting extruded monoliths has several drawbacks. They include deformation of the monolith, if it is cut before the extrudate is dried, and material loss and possible breakage if the monolith is cut after drying or high temperature sintering. For extruded monoliths it may be impossible to recycle the material from defective pieces, after they have been dried.

Injection moulding is another forming technique where a plastic feedstock is heated to reduce the feedstock's viscosity, before being injected into the mould. Powder injection moulding (PIM) is a forming technique used in the metal and ceramic industries as a net-shape forming technique (R. L. Billiet and T. H. Billiet, "A Practical Guide to Metal and Ceramic Injection Moulding", Elsevier Advanced Technology, 1 Jun. 2005, and B. Mudsutty and R. G. Ford, "Ceramic Injection Molding (Materials Technology)", Kluwer Academic Publishers, 30 Nov. 1994). It involves producing and moulding a feedstock containing the metal or ceramic powder along with dispersants and thermo-softening binders and lubricants. PIM has been regarded as not suitable for catalyst production since the moulds were regarded to be expensive and not sufficiently durable. An example of use of powder injection moulding for forming ceramic objects is given in US 2002/0068005, which discloses production of by admixing particulate metallic and metal-ceramic components and a wax, and then heating the mixture to a floating state, injection into a mould followed by cooling to a solid state.

From U.S. Pat. No. 4,743,578 it is known that ceramic catalysts may be shaped to form interlocking self-supporting structures which may be assembled to form a catalyst covering the entire cross sectional area of a reactor. The ceramic catalysts may be provided with through-going channels for passage of reactants in fluid state.

OBJECTIVE OF THE INVENTION

The main objective of the invention is to provide a cost effective method for manufacturing solid ceramic catalysts with enhanced catalytic performances.

A further objective is to provide catalysts which generate turbulent flow in their internal channels.

The objectives of the invention may be obtained by the features as set forth in the following description of the invention and/or in the appended patent claims.

LIST OF FIGURES

FIG. 11 is a schematic representation of a CFD-calculation showing the pressure drop in the case of a channel with one step-wise expansion of the channel.

FIG. 12 is a photograph of an example embodiment of a monolith catalyst according to the invention.

FIG. 13 is a side view of the internal channels in the embodiment shown in FIG. 12.

FIG. 14 is a comparison of the catalytic activity of the monolith catalyst shown in FIG. 12 in the case of internal channels with a step-wise narrowing and with straight channels (no narrowing).

DESCRIPTION OF THE INVENTION

Figure 1:
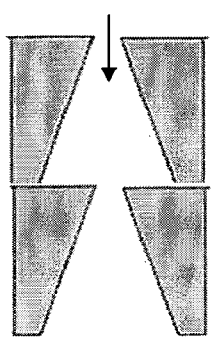
FIG. 1 shows examples of catalysts with varying cross-sectional areas of the channels according to one aspect of the present invention.
Figure 1:
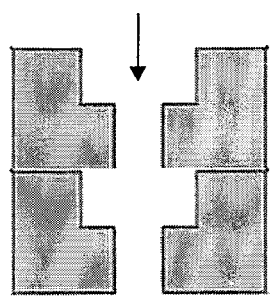
Figure 1:
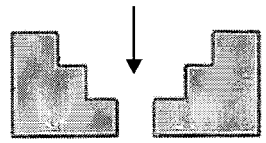
Figure 1:
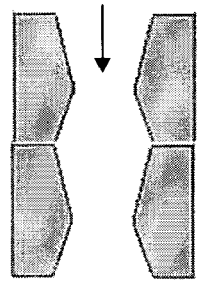

The invention is based on the realisation that cost effective ceramic catalysts with voidage fractions ranging from about 30% to above 90%, with internal channels providing fluid flow, and which are comparable in size and shape as present monoliths, may be manufactured by use of powder injection moulding (PIM). The powder injection moulding process also provides larger freedom to shape the catalysts both on overall design and internal design of the channels.

In a first aspect, the invention relates to a method for production of ceramic catalysts, comprising:
   preparing a ceramic formulation with temperature controlled rheological properties comprising catalytic components,
   heating the powder formulation up to at least the fluid state transition temperature,
   shaping a sample by injecting the fluid powder formulation into an injection mould followed by cooling the injected powder formulation below the fluid state transition temperature,
   de-binding the shaped sample, and
   sintering the shaped sample to form a ceramic catalyst.

In a second aspect, the invention relates to a method for production of catalysts, comprising:
preparing a ceramic support formulation with temperature controlled rheological properties,
heating the powder formulation up to at least the fluid state transition temperature,
shaping a sample by injecting the fluid powder formulation into an injection mould followed by cooling the injected powder formulation below the fluid state transition temperature,
de-binding the shaped sample,
sintering the shaped sample to form a ceramic support structure, and
coating the surfaces of the ceramic support carrier structure with one or more catalytic compounds.

The second aspect allows forming ceramic structures without catalytic properties, and then applying the catalytic compounds onto the ceramic structures. This enables use of other ceramics with different mechanical and chemical properties than catalytic ceramics, and use of other catalysts such as noble metals, palladium, etc.

An injection mould as used herein means any sufficiently heat and pressure resistant mould that may successively be opened for retrieval of the moulded object and closed for moulding a new object. In closed position the mould will form an internal chamber with the inverse shape of the objects that are to be formed. The mould should include at least one inlet for injection a paste and at least one outlet for gases such that injected paste may fill all available space in the internal chamber. The injection mould may contain one or more pins, cylindrically or another shape, extending from one end to the opposite end of the internal chamber of the mould, which will make through-going channels in the moulded objects.

One advantage of injection moulding compared to extrusion, is an enhanced freedom to designing the shape of the catalysts. An extruded object will necessarily have identical cross-sectional areas along a longitudinal axis (when the cross-sectional planes are perpendicular to the axis). An injection moulded object is not confined to this restriction, it may be given irregular shapes since the shape of a moulded object is defined by the physical dimensions and design of the walls of the injection moulds internal chamber. Thus ceramic catalysts made by the first aspect of the invention may be given a non-symmetric shape, or more or less symmetric shapes such as objects with circular, elliptical, triangular, square, hexagonal, or other straight-edged polygonal cross-sectional areas, enabling construction of a tessellation of catalyst blocks enabling filling up the entire cross-sectional area of a reactor. It is also possible to design the catalysts with complementary protrusions and recessions that will form an interlocking grip when placed side by side, enabling maintaining the relative positions of the individual catalysts in a reactor during thermal cycling.

A third aspect of the invention relates to ceramic catalysts monoliths comprising one or more through-going channels with varying cross-sectional areas. This might be obtained by supplying the injection mould with a number of pins with a variable diameter, i.e. a tapering, stepwise decreases of the diameter, etc., which will form channels in the moulded object with varying cross-sectional areas promoting turbulence when fluids are flowing through the channels. The channels may be given circular, elliptical, square, triangular, hexagonal, or other forms of the channels cross-sectional areas. The catalysts may be given channels which have a length from 0.1 mm to about 800 mm, alternatively from 5 mm to 150 mm, alternatively from 5 to 20 mm.

A fourth aspect of the invention relates ceramic catalytic monoliths with a number of internal channels provided with at least one protrusion and one complementary recession enabling forming an interlocking grip when the monoliths are placed abutting each other.

A fifth aspect of the invention relates to use of powder injection moulding for making ceramic catalysts.

The obtained freedom of shaping the catalysts enables producing catalysts with shapes and surfaces promoting turbulence in fluids passing along the outer surface and/or in fluids flowing in channels in the catalysts. The turbulence may be obtained by providing the surface of the catalysts with a rugged surface, for instance a specific pattern of physical protrusions, dimples, etc. Alternatively, or in addition to the rugged surface, the overall design of the catalysts may be given an irregular shape promoting turbulence due to sharp edges etc.

The powder injection moulding technique according to the first aspect of the invention may be applied to form relatively small ceramic catalysts with a number of internal channels, such as for example catalysts known by the name miniliths. Minilith as used herein means relatively small ceramic catalysts with one or more internal channels, and which usually are placed randomly in the flow direction of a gas or fluid to be catalysed. Miniliths are often given a cylindrical form and is commonly used in packed bed reactors. However, miniliths with any shape including cylindrical and non-cylindrical shapes is included in the invention.

The technique also enables preparing larger structures, such as catalysts known by the name monoliths. Monolith is here defined to be relatively larger objects with a longitudinal form, which includes one or more internal channels. Monoliths are often placed orderly in the flow direction of the gas or fluid to be catalysed, forcing the reaction fluids to pass through the internal channels. One example is a cylindrical monolith with channels. It is possible to use a single monolith or a stack of more than one monolith in a process to be catalysed. A stack may be orderly placed on top of each other and may be separated by a separator. In one example the separator is a wire net.

The turbulence in the flowing fluids may alternatively be obtained by employing stacks of ceramic catalysts which comprises parallel channels which are placed more or less orderly on top of each other, whereby the passing fluids are forced to at least repeatedly enter and exist the catalyst elements whereby promoting turbulence during entry and exit.

Further the catalyst of the present invention can have the form of particles/small solid objects without channels. These particles/objects may be solid or porous. A porous particle/object is a form which comprises a higher surface than a solid part, for example a porous form may have pores or cracks such that the gas may enter the catalyst. The particles/objects may have irregular forms which promote turbulence in gas in a process to be catalysed, e.g. forms with edges or cut-outs. The person skilled in the art may easily design particles/objects with shapes promoting turbulence in fluids flowing through beds/stacks of the particles/objects.

One difference between injection moulding and extrusion is the formulation of the paste. In extrusion, a paste is formulated such that it behaves as a Bingham Plastic Fluid and exhibit a linear shear-stress versus shear-rate behaviour after an initial shear-stress threshold, the Yield Stress, has been reached. Therefore, when sufficient shear forces are applied to the paste in the extruder barrel and the die, the paste will flow. However, when the extruded paste exits the die, the paste is no longer subjected to shear forces, and the shear stress fall below the Yield Stress. Therefore, the paste behaves as a solid. A typical water-based extrusion formulation according to prior art is shown in Table 1.

TABLE 1

A typical extrusion plastic body (density of oxide = 7.3 gcm$^{-3}$)

| Constituents | Role | Wt % |
|---|---|---|
| Catalyst oxide | | 81.0 |
| Hydroxyethylcellulose ether | Binder | 4.0 |
| Polyethylene glycol | Plasticiser | 2.0 |
| Water | Solvent | 13.0 |

In PIM, the paste is formulated such that the desired rheological properties of the paste are controlled by temperature. The paste needs to be fluid when located in the injection moulding cylinder. The mould is held at a temperature below the freezing point of the paste, so that during and after injection, the paste is cooled and the viscosity increases. After a short period of time (typically 30 seconds to one minute), the viscosity of the paste is sufficiently high that the mould may be opened and the moulded pieces extracted. The temperature of the paste and of the mould must be optimised such that the mould temperature is sufficiently high so that the paste does not freeze before the mould is completely filled, but the mould is not at such a high temperature that the paste takes an excessive time to freeze. A typical wax-based injection moulding paste is shown in Table 2.

TABLE 2

An injection moulding formulation according to the invention

| Constituent | Wt % | Melting point ° C. |
|---|---|---|
| Oxide | 80 | |
| Paraffin wax | 15 | 44 to 50 |
| Polyethylene wax | 2 | 80 to 90 |
| Vegetable wax (Copernicia cerifera) | 2 | |
| Cis-9-octadecenoic acid | 1 | |

The formulations will typically include, but are not limited to, catalyst powder, binders, lubricants and surfactants are blended and thermally treated to melt the organics. The appropriate rheological properties depend on the injection moulding technology being utilized (i.e. temperature and available injection pressure), and the size and geometry of the part being produced. The typical ranges of viscosities of injection moulding pastes, at shear rates of 10 and 100 s$^{-1}$ are 100 000 to 1000 poise, and 1000 to 100 poise, respectively. However, pastes outside of the ranges may also be injection moulded. The fluid transition temperature will typically be between 40 to 200° C. The injection pressure will typically be between 3 to about 100 bar absolute. For formulations allowing low pressure injection, the pressure may be down to about 1 bar absolute.

The method of the present invention is a continuous and effective process. A drying step is not required and shrinkage does not occur. It is possible to recycle material back to the beginning of the process. Time is especially saved by the fast process of injection moulding and the short time for de-binding.

The present invention provides catalysts with reproducible density and excellent flow properties. Catalysts can be formed into many shapes as the moulds can be changed in a powder injection machine tool and thereby can the form of the catalysts easily be tailor made for different processes, as industrial processes and as well catalytic processes in cars, to name some. Thereby there can be achieved catalysts with oblong form which have low pressure drop when applied in the catalytic process. The catalysts made by the present invention are strong after de-binding and sintering, and may be handled easily.

The catalysts of the present invention may be dimensioned to fit into existing plants with no/little modification of the existing processes.

The invention is not restricted to the formulation presented in Table 2. Any ceramic formulation containing catalytic components and which has a temperature controlled rheology may be applied.

Verification of the Invention

The invention will now be described in greater detail by way of examples of possible embodiments of the invention. These embodiments should not be considered as a limitation of the general inventive idea of employing powder injection moulding to produce catalysts. This general inventive concept is valid for all presently known and foreseeable catalysts.

EXAMPLE 1

FIG. 1 shows the cross-section through several channels of a catalyst with non-parallel channels according to the present invention. 1A shows a channel with linear extension, one stepwise narrowing and linear extension. 1B shows a stepwise narrowing, followed by a stepwise extension and followed by a stepwise narrowing. 1C shows a channel with 2 stepwise narrowings. 1D shows a linear narrowing followed by a linear extension and followed by a linear narrowing and linear extension. The arrow indicates the channel where the gas may flow and the dark areas represent the catalytic material which surrounds the channel. The flow direction can be reversed.

EXAMPLE 2

Figure 2:
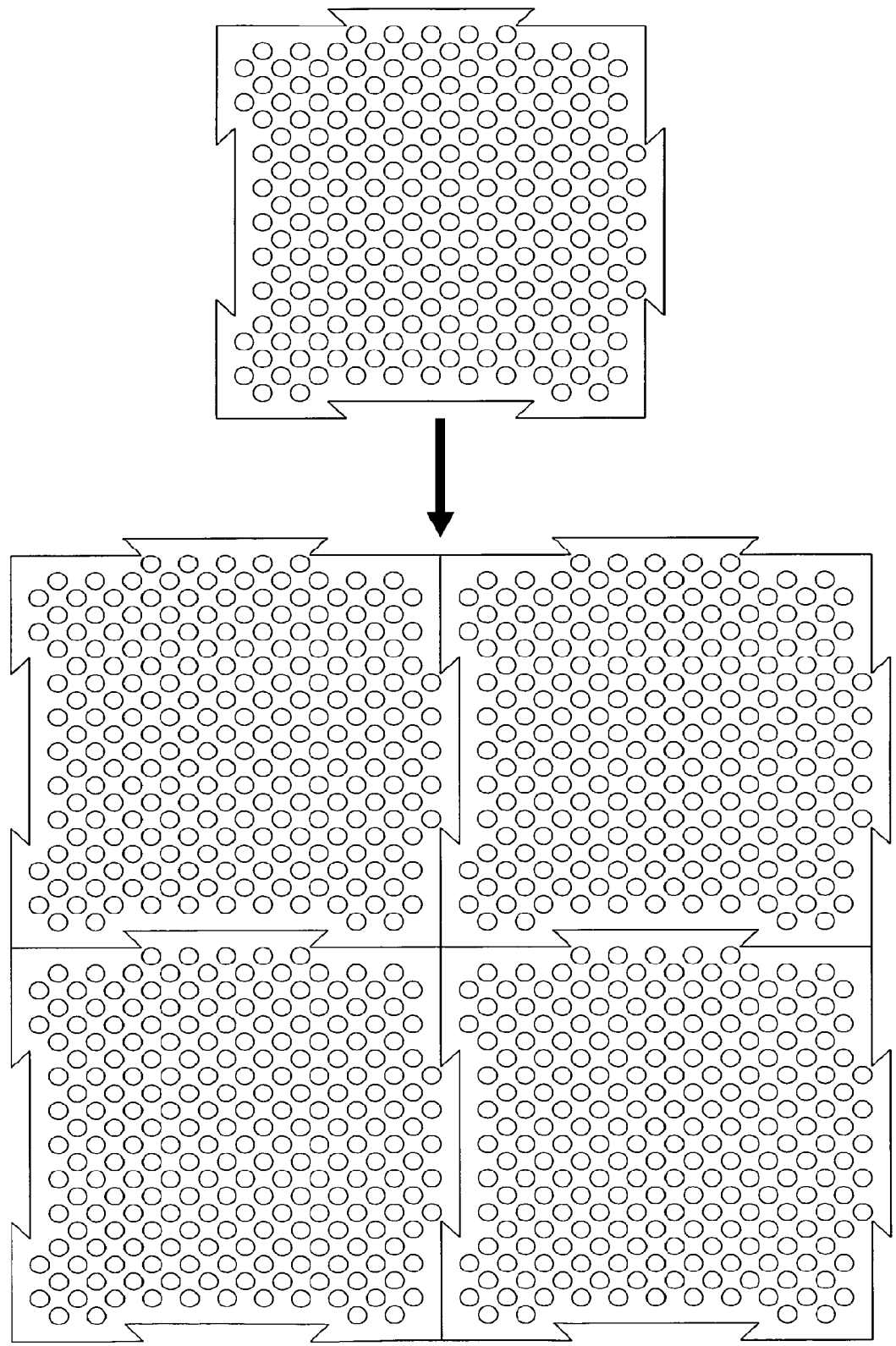
FIG. 2 shows one example of interlocking catalysts according to the present invention.
Figure 3:
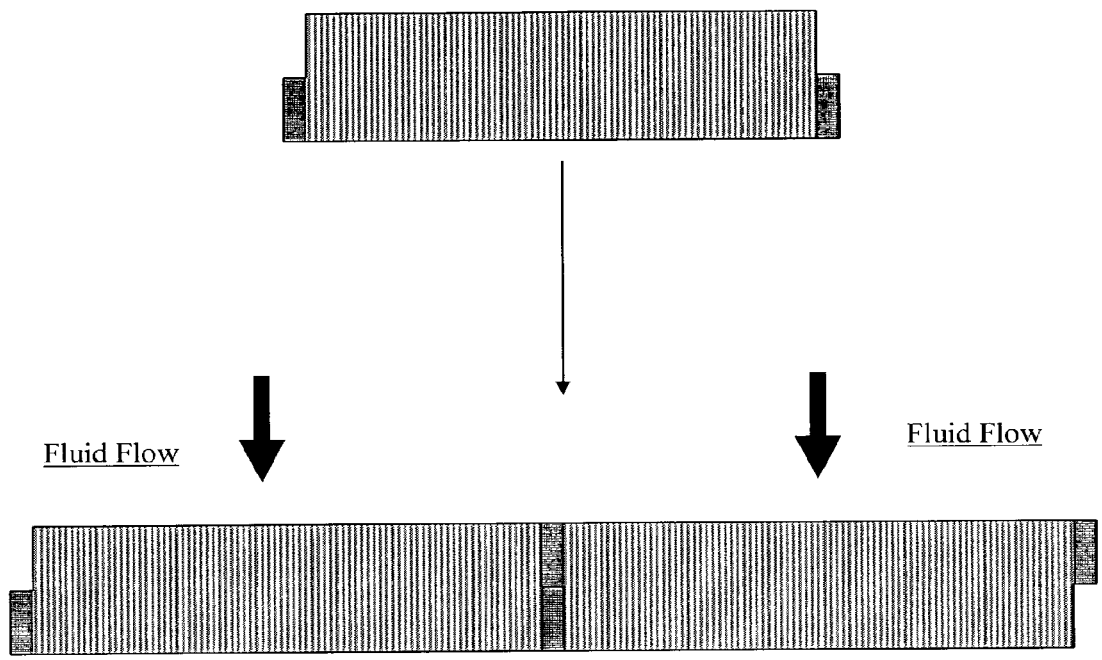
FIG. 3 shows another example of interlocking catalyst to the present invention, where adjacent catalysts overlap to prevent reactive fluid bypass

FIGS. 2 and 3 show several forms of monolith parts which may be made by the present invention, and which overcome some problems of installing monoliths in reactors which are larger in diameter than the monolith blocks. FIG. 2, shows an example of how moulding may readily produce a monolith block that locks it to adjacent blocks, thus preventing gaps between blocks developing when they are heated in a reactor. Gaps between the blocks may lead to by-passing of the reactant fluid. FIG. 3 illustrates another way in which moulded blocks may eliminate fluid by-passing. This monolith configuration can not be produced by extrusion.

EXAMPLE 3

Figure 4:
FIG. 4 is a schematic diagram showing the method according to the first aspect of the invention.

A process flow with PIM according to the present invention is shown schematically in FIG. 4. In step 1 the components are blended and the organic components are melted; in step 2 the components from 1 are subjected to injection moulding; in step 3 the injection moulded samples are de-bound and in step 4 the de-bound samples are sintered.

In step 1 the components including catalyst powder, binders, lubricants and surfactants are blended and thermally treated to melt the organics. The appropriate rheological properties depend on the injection moulding technology being utilized (i.e. temperature and available injection pressure), and the size and geometry of the part being produced. The typical ranges of viscosities of injection moulding pastes, at shear rates of 10 and 100 s$^{-1}$ are 100 000 to 1000 poise, and 1000 to 100 poise, respectively. However, pastes outside of the ranges may also be injection moulded.

In one example for step 1 the temperature of the paste is in the range of 80 to 200° C., and preferably in the range of 100 to 150° C.

In one example for step 2 the mould of the injection moulding machine is at a lower temperature, the paste subsequently cools and solidifies in the mould. Typically injection moulding is completed within 30 seconds.

For de-binding in step 3, the injection moulded samples are loaded into a de-binder which may be directly after injection moulding or later. The de-binder may be a furnace for removal of a significant proportion of the organic phases by combustion, evaporation or pyrolysis. (De-binding may also be carried out by catalytic decomposition of the organic phases, or by dissolution in a solvent and by liquid extraction.) The solvent may be a liquid or a super-fluid. De-binding may remove 50-80% of the organics in the final catalyst or de-binding may remove 80 to 100% of the organic material.

Another method of the present invention uses a support material produced by PIM which is coated by catalytic material in another step. Thereby the coated supporting material promotes turbulence of passing fluids to be catalysed.

Sintering in step 4 is done by techniques known in the art. The atmosphere and temperature profile of the furnace or oven are governed by the nature of the material being sintered.

EXAMPLE 4

According to the present invention powder can be moulded with medium pressure injection moulding (MPIM) at a temperature from ambient temperature to 150° C. or from 40 to 130° C. or from 60 to 110° C. or from 80 to 100° C. The pressure may be 3 to 50 bar or 10 to 40 bar or 20 to 30 bar.

EXAMPLE 5

According to the present invention powder can be moulded by low pressure injection moulding (LPIM) at a temperature from ambient temperature to 150° C. or from 40 to 130° C. or from 60 to 110° C. or from 80 to 100° C. The pressure may be from 0 to 5 bar, from 1 to 4 bar or from 2 to 3 bar.

EXAMPLE 6

According to the present invention powder can be moulded by high-pressure injection moulding (HPIM) at a temperature from ambient temperature to 250° C. or from 50 to 220° C. or from 70 to 190° C. or from 100 to 170° C. The pressure may be greater than 50 bar or greater than 70 bar or greater than 90 bar.

EXAMPLE 7

Figure 5:
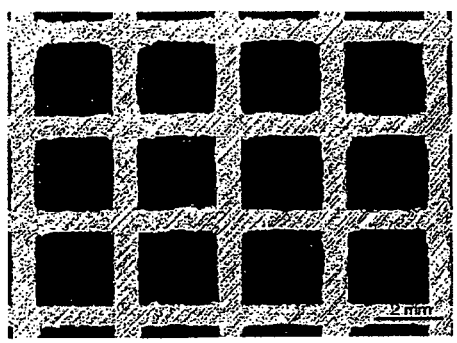
FIG. 5 shows pictures of an example of monolith catalysts according to the present invention, 5C, compared with two examples of monolith catalysts made by prior art extrusion, 5A and 5B.
Figure 5:
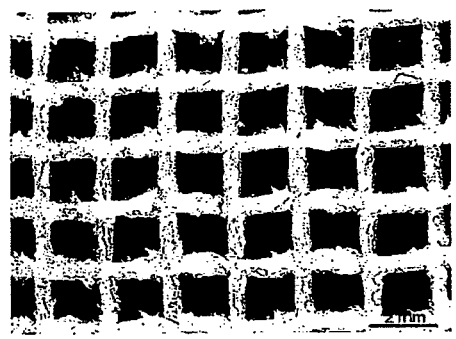
Figure 5:
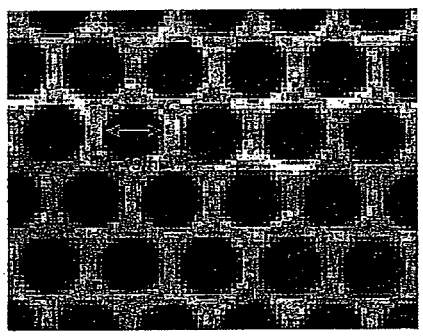

FIG. 5 shows a microscopy cross section of a catalyst of the present invention 5C and catalysts made by extrusion, 5B and 5A. Their properties are shown in table 3.

TABLE 3

Properties of catalysts.

| Catalyst | Voidage [%] | Wall thickness [mm] | Channel size [mm] |
|---|---|---|---|
| 5A | 60 | 0.70 | 2.37 |
| 5B | 48 | 0.61 | 1.38 |
| 5C of present invention | 56 | n.a. | 1.50 |

It is clear from FIG. 5, that the quality of the low-voidage, extruded monolith 5B, is poor compared to the high-voidage extruded monolith, 5A. In the case of 5B, the ratio between the total cross-sectional area of the die pins, which create the channels, and total cross-sectional area of the die is too low to generate sufficiently high shear stress for effective extrusion (Sum of the cross-sectional area of the die pins/total cross-sectional area of the die). This ratio is equivalent to the void fraction of the monolith. The poor quality of the extruded monolith 5B is reflected in its poor mechanical properties compared to the high voidage monolith 5A. Comparing the conventional extruded monolith 5A to the example of an injection moulded monolith 5C; the conventional monolith has a higher voidage, and thus a lower solid volume, than the injection moulded monolith, along with a larger channel size than the injection moulded monolith.

EXAMPLE 8

Commercial De-$N_2O$ catalyst of prior art was produced in the form of cylindrical pellets, which have seven channels passing through them by dry pressing according to prior art. This form of pellet is described as a minilith. These pellets were installed in the ammonia burner as a random packed-bed which was located directly below the platinum-based combustion gauzes, and replaced (fully or partially) the Raschig ring (ceramic ring) bed that acted as a support for the catalyst.

An extruded, square channelled, monolith catalyst was produced via a paste formulation, as described in Table 1, and was extruded by a ram extruder through a square channelled die. The wall thickness, after thermal treatment was circa 0.70 mm and the channel edge dimension was circa 2.37 mm. This catalysts was installed in the pilot reactor, with the channels aligned in the direction of gas flow.

Another catalyst has been produced by powder injection moulding according to the present invention. The catalyst powder was mixed with appropriate quantities of paraffin wax, polyethylene wax, vegetable wax and Cis-9-octadecenoic acid. The materials were mixed in a heated mixer, which may be of the Hobart or Sigma blade types. The temperature was approx. 130° C. The molten ceramic paste is loaded in to the barrel or cylinder of the injection moulding machine, which was also heated to about 130° C. The die attached to the injection moulding machine was heated to circa 80 to 90° C. It had the form of a monolith of 25×25×10 mm, composed of 156 parallel channels with an internal diameter of around 1.5 mm. The channels were formed by 1.5 mm core pins of hardened steel. After injecting the catalyst paste into the mould, and waiting for circa 1 minute, for the moulded piece to cool, the mould was opened and the monolith piece was removed from the mould. The moulded piece is placed in a de-binding oven, operated with a flow of air. The monolith pieces are buried in a bed or absorbent ceramic powder, which acts as a wick for molten wax. Alternatively, the monolith part is placed on the surface or a shallow bed of absorbent powder. In each case, the absorbent powder may be replaced with catalyst powder. This has the advantage that reactions between the catalyst and the powder, at elevated temperatures, are avoided. The catalyst powder, used for embedding or supporting the catalyst, may be a freshly produced powder or a spent (used) catalyst that has been milled to the appropriate size. After the de-binding step, the monolith is sintered to complete chemical reactions within the catalyst and to provide further mechanical strength. The layers of the injection-moulded monolith are installed in the burner, with each layer being separated by a wire screen or mesh of a heat-resisting alloy.

Beds of the minilith and the injection-moulded monolith were installed in a pilot plant reactor attached to full-scale nitric acid plant. Up to 3 liters of catalyst may be installed in the pilot plant. The pilot plant is able to reproduce the reaction conditions of full-scale plants, in terms of pressure, temperature and gas velocity. In the case of De-$N_2O$ catalyst testing, the $N_2O$ is generated by the combustion of ammonia (approximately 10 vol % in air) by a stack of platinum-based combustion gauzes, which are located up-stream of the De-$N_2O$ catalyst bed.

Figure 6:
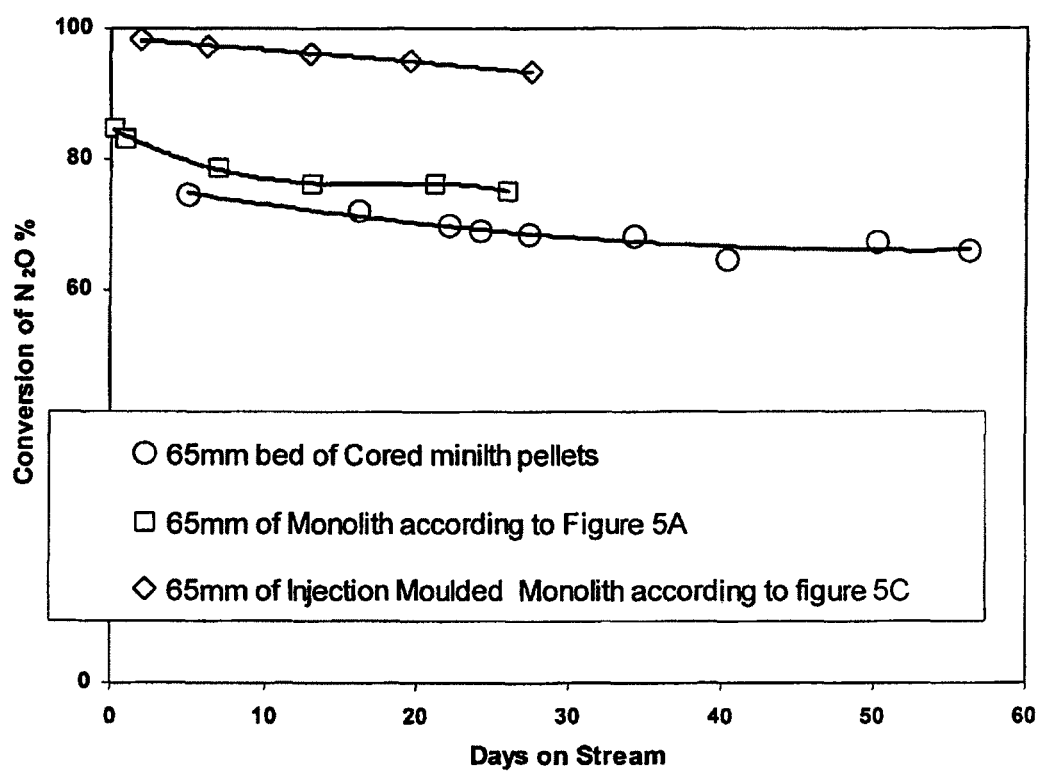
FIG. 6 shows performance of equal volumes of pellets and a conventional extruded monolith from prior art and an injection moulded monolith according to the present invention for $N_2O$ decomposition

FIG. 6 shows the performance of equivalent heights of De-$N_2O$ catalyst, in the form of minilith pellets, conventional extruded monoliths and a stack of Injection Moulded Monolith layers. The catalysts were operated at 900° C. and 5 bara pressure, with a gas feedstock containing 1200 ppm $N_2O$, 10% NO, 15% $H_2O$ and balance nitrogen. It is clearly observed that the injection moulded monolith stack of the present invention has a far higher activity (volume-based activity) than a bed of randomly packed minilith pellets and the conventional monolith of prior art.

EXAMPLE 9

The fluid dynamics of channels without and with step-wise reductions in the channels cross-sectional area were analysed by Computational Fluid Dynamics (CFD) calculation using the software Fluent 6.3. The calculation provides velocity and vorticity profiles. High vorticity is correlated with high mass transfer and thereby high reaction rates.

There was simulated a gas flow through a single, parallel channel of a monolith, under typical ammonia combustion gas conditions (Gas density 1.44 $kgm^{-3}$, Viscosity=$4.80 \times 10^{-5}$ $Nsm^{-2}$ and velocity=1.5 $ms^{-1}$).

Figure 7:
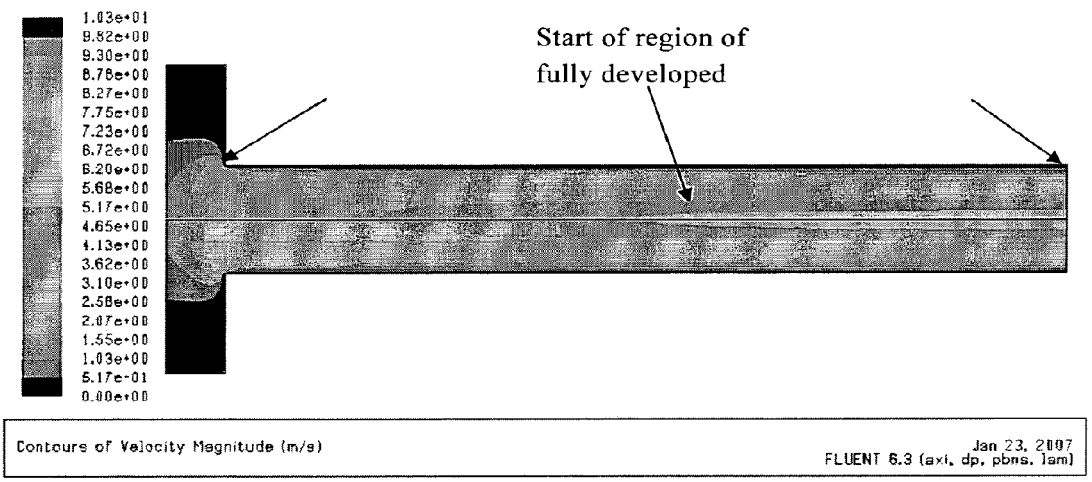
FIG. 7 is a schematic representation of CFD-calculation showing velocity profiles of gas flow through a circular regular monolith channel.
Figure 8:
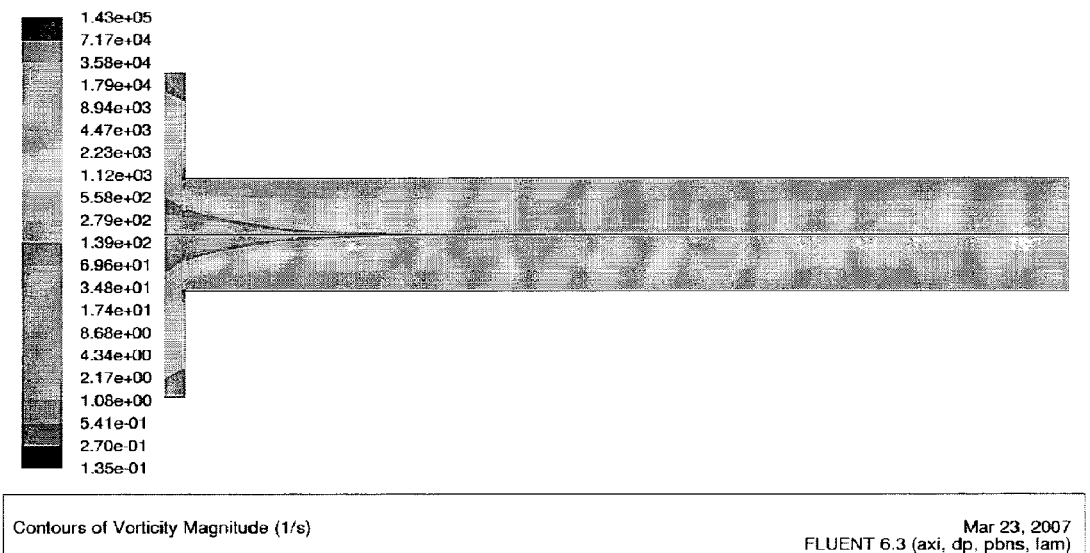
FIG. 8 is a schematic representation of CFD-calculation showing vorticity profiles of gas flowing through a circular regular monolith channel.

FIG. 7 shows the velocity and FIG. 8 the vorticity of a circular parallel monolith channel with a diameter of 1.4 mm and a length of 10 mm. There was observed that fully developed flow (laminar) is attained approximately 5 mm from the channel entrance. There is low vorticity.

Figure 9:
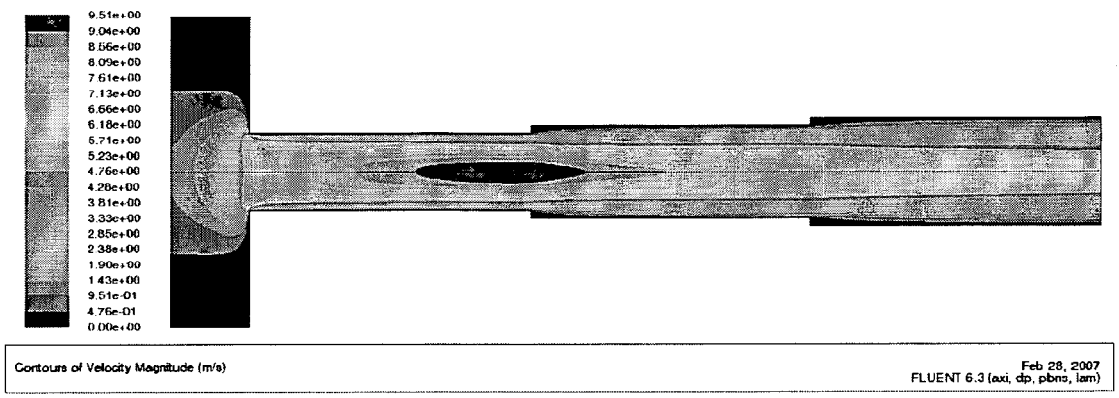
FIG. 9 is a schematic representation of a CFD-calculation showing velocity profiles in the case of a channel with three step-wise expansions of the channel.
Figure 10:
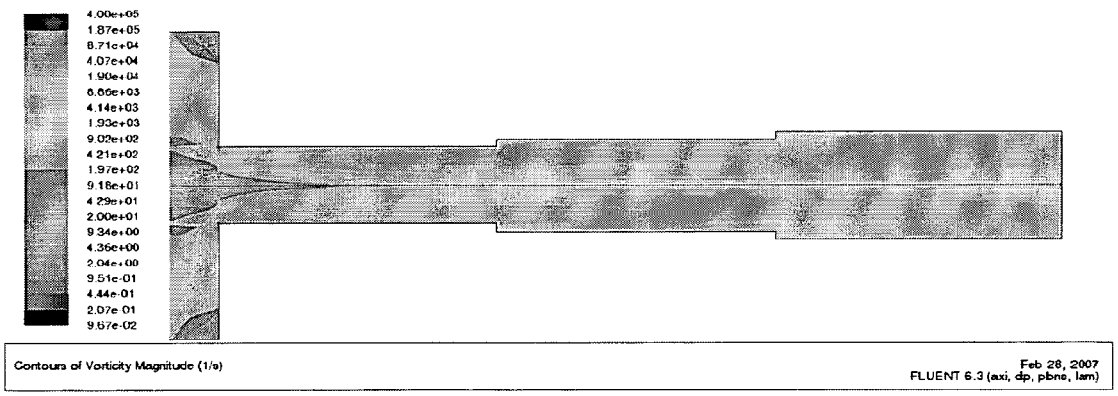
FIG. 10 is a schematic representation of a CFD-calculation showing vorticity profiles in the case of a channel with three step-wise expansions of the channel.

Thereafter, there was analysed the velocity profile and vorticity of a channel with 1.0 mm diameter with two rapid expansions whereby the final diameter was 1.4 mm. The result of this 3 step monolith is shown in FIGS. 9 and 10 respectively.

The velocity is clearly higher in the 3-step monolith compared to parallel monolith. The vorticity is very high along the narrow part of the channel and as well along into the medium part of the channel. This high vorticity is associated with high mass transfer.

The calculated pressure changes along the length of various channel geometries are shown in FIG. 11. It is observed that there is a rapid increase of pressure at the entrance to the channel, which is associated with high mass transfer. This is followed by a linear increase in pressure, at a lower rate, which is associated with the transition to laminar flow. For channels which have geometries with rapid expansions there is a maximum in pressure. The maxima may be a local maximum, or an overall maximum, depending on the channel geometry. This is a zone with increased mass transfer.

The direction of fluid flow has an impact on the pressure drop across the monoliths with channels with rapid expansions. The channel geometry determines which fluid flow direction has the highest pressure drop or if the pressure drop is independent of flow direction. Channels with rapid expansions/contractions may be designed to give pressure drops that are dependant or are independent of fluid flow direction.

EXAMPLE 10

The fluid dynamic computations of example 9 is followed up by experiments with two sets of monolith blocks were prepared from a cobalt-based oxide (2 mole %) supported on cerium oxide, which is known to be active for $N_2O$ decomposition.

The $N_2O$ decomposition catalyst is prepared by a spray deposition method. Cerium oxide powder (10 kg) is dispersed in 5 liters of water, in which polyvinyl alcohol (80 g) had been pre-dissolved. To this dispersion, cobalt acetate tetrahydrate (579 g) and basic aluminium acetate (188 g) are added, and the resulting slurry is stirred for one hour. The slurry is then wet milled, using ball, bead or stirred-media mills, until the $d_{50}$ particle size is reduced to below 5 microns. After milling, the slurry is de-gassed and spray dried, to produced dry granules, which have a homogeneous distribution of cerium oxide and the cobalt and aluminium salts. The spray-dried granules are calcined in air at a temperature in excess of 800° C. and less than 1000° C., to decompose the metal salts and to bring about the reaction between the cobalt and aluminium species. This results in a catalyst that contains 2 mole % $Co_2AlO_4$ active phase supported on cerium oxide. The calcined granules are milled to reduce the particle size to a level that is acceptable for injection moulding (<10 microns). The mole fraction of the active phase may be varied between 0.5 and 10 mole % and the cobalt-aluminium ratio in the active phase may be infinitely varied within the range of 99/1 and 1/2.

Medium pressure injection moulding, using a commercial paraffin based wax binder system, such as that described in Table 2, is used to form the catalyst. The milled powder is mixed with the organic processing aids and binders, in a heated Hobart-type mixer. After mixing the paste for 30 minutes at 90° C., the paste is ready for injection moulding. Two injection moulding tools, or dies, were used to produce the catalyst in the form of multi-channel monolith blocks of dimensions of approximately 25×25×10 mm. The channels were in hexagonal arrays (See photograph in FIG. 12) with 7 rows of 12 channels and 6 rows of 11 channels each, together 150 internal through-going channels of internal diameter 1.5 mm. The same batch of catalyst-wax feedstock was used to produce each of the two monolith sets.

The difference between the two sets of blocks was the design of the internal channels. Design one consisted of straight channels with a diameter of 1.5 mm. Design 2 contained channels with an abrupt stepwise increase of the diameter of the internal channels in them; going from a channel diameter of 1.0 mm to 1.5 mm within the block. A cross section of the stepped channel is shown in FIG. 13.

The paste feedstock was heated to circa 90° C. in the feed hopper of an injection moulding machine. The tools were heated to circa 70° C., prior to moulding. After the moulding step, the moulded pieces were removed from the tool and were ready for thermal treatment.

After thermal de-binding, and sintering of the monoliths blocks at 1000° C., the catalytic performance of each monolith design, towards nitrous oxide decomposition, was evaluated in pilot reactor tests. The monoliths made by the method may have dimensions ranging from 25×25×10 mm to 200× 200×100 mm, alternatively from 25×25×10 mm and 200×200 and 100 mm, or from 25×25×10 mm and 100×100 and 100 mm.

Two layers of monoliths, separated by heat resistant alloy meshes, were installed in the pilot reactor, which had a diameter of circa 25 cm. A gas stream at 5 bar pressure and 900° C., containing circa 1250 ppm of $N_2O$, 10% NO, 6% $O_2$, 15% $H_2O$ and the balance being nitrogen, was passed over the monoliths at a flow rate of 280 $Nm^3$/h. Sampling points prior to and after the monolith bed allowed the determination of $N_2O$ decomposition across the monolith blocks to be made.

The results from the two tests of straight channelled monoliths and stepped channel monoliths are shown in FIG. 14.

From FIG. 14, we observe that the $N_2O$ conversion over the stepped channel monolith is significantly higher than for the straight channel monolith. The $N_2O$ decomposition over the straight-channel monoliths was in the range of 26.6 to 34.4%. Over the stepped-channel monoliths, the range of conversion was from 37.9 to 45.2%. Therefore, we may conclude that the stepped-channel monolith decomposes approximately 25% more $N_2O$, per unit reactor volume, than the straight-channel monoliths. This demonstrates that the monolith with internally structured channels give a significantly higher catalytic performance than straight channelled monoliths. Injection moulding is the only forming method that is able to produce monolith catalysts, with internally-structured channels, on a large scale and at a low cost.

The invention claimed is:

1. A method for production of a ceramic catalyst, the method comprising:
preparing a powder ceramic formulation comprising a catalytic component comprising one or more catalyst powders, one or more binders, one or more lubricants, and one or more surfactants, wherein the powder ceramic formulation has temperature controlled rheological properties;
heating the powder ceramic formulation to at least a fluid state transition temperature to obtain a fluid powder formulation;
shaping a sample by injecting the fluid powder formulation into an injection mold followed by cooling the injected fluid powder formulation to obtain a shaped sample;
de-binding the shaped sample; and
sintering the shaped sample to form a ceramic catalyst,
wherein following the shaping step, the sample is cooled below the fluid state transition temperature before the de-binding and sintering steps are performed, and
wherein the injection mold is provided with a number of pins extending across an internal space of the injection mold such that the formed ceramic catalyst obtains a number of through-going internal channels to obtain a voidage fraction ranging from 30% up to 90%.

2. The method according to claim 1, wherein:
a dimension and physical design of internal walls defining the internal space of the injection mold are designed to form ceramic catalysts which are comparable in size and shape as present monoliths.

3. The method according to claim 2, wherein the pins have a variable diameter in order to form channels with varying cross-sectional areas.

4. The method according to claim 2, wherein the pins have at least one stepwise increase of a pin diameter in order to form internal through-going channels in the ceramic catalyst having an abrupt stepwise increase in a diameter of the through-going channels.

5. The method according to claim 2, wherein the pins have a tapered diameter in order to form channels with varying cross-sectional areas.

6. The method according to claim 2, wherein:
the catalyst is a monolith with dimensions ranging from 25×25×10 mm to 200×200×100 mm.

7. The method according to claim 2, wherein the pins form one or more through-going channels, and said channels have a varying cross-sectional area along a longitudinal direction of the channels.

8. The method according to claim 7, wherein the channels have one or more stepwise changes in channel diameter.

9. The method according to claim 7, wherein the catalyst is made of a ceramic oxide material coated with a catalytic material.

10. The method according to claim 7, wherein the catalyst is made of a catalytic ceramic oxide material.

11. The method according to claim 10, wherein the ceramic formulation contains a cobalt based oxide capable of catalytically aiding decomposition of nitrogen oxides.

12. The method according to claim 11, wherein:
the cobalt based oxide comprises an active $Co_2AlO_4$-phase on a cerium oxide support;
the catalyst is a monolith with dimensions ranging from 25×25×10 mm to 200×200×100 mm;
the through-going channels have a circular cross-section and their internal diameters are abruptly increased from 1.0 mm to 1.5 mm inside the ceramic catalyst; and
the through-going channels are ordered in a hexagonal pattern.

13. The method according to claim 12, wherein the catalyst produced is equipped with one or more protrusions and one or more complementary recessions enabling forming an interlocking grip when the monoliths are placed abutting each other.

14. The method according to claim 12, wherein:
the catalyst is a monolith with dimensions ranging from 25×25×10 mm to 100×100×100 mm.

15. The method according to claim 7, wherein the varying cross-sectional area is formed by a linear reduction of an internal diameter of the channels.

16. The method according to claim 7, wherein:
the through-going channels may be given circular, elliptical, square, triangular, hexagonal, or other forms of cross-sectional areas; and
the catalysts may be given channels which have a length from 0.1 mm to 800 mm.

17. The method according to claim 16, wherein:
the catalysts may be given channels which have a length from 5 mm to 150 mm.

18. The method according to claim 16, wherein:
the catalysts may be given channels which have a length from 5 to 20 mm.

19. The method according to claim 1, wherein the ceramic formulation comprises 80 weight % ceramic oxides, 15 weigh % paraffin wax, 2 weight % polyethylene wax, 2 weight % vegetable wax, and 1 weight % cis-9-octadecenoic acid.

20. The method according to claim 19, wherein the vegetable wax is *Copernica cerifera*.

21. The method according to claim 19, wherein the fluid state transition temperature is between room temperature to 150° C.

22. The method according to claim 19, wherein an injection pressure is between 3 to 100 bar absolute.

23. The method according to claim 19, wherein the fluid state transition temperature is between 40 to 130° C.

24. The method according to claim 19, wherein the fluid state transition temperature is from 60 to 110° C.

25. The method according to claim 19, wherein the fluid state transition temperature is from 80 to 100° C.

26. A method for production of a catalyst, the method comprising:
preparing a powder ceramic support formulation comprising one or more binders, one or more lubricants, and one or more surfactants, wherein the powder ceramic support formulation has temperature controlled rheological properties;

heating the powder ceramic formulation to at least a fluid state transition temperature to obtain a fluid powder formulation;

shaping a sample by injecting the fluid powder formulation into an injection mold followed by cooling the injected fluid powder formulation to obtain a shaped sample;

de-binding the shaped sample;

sintering the shaped sample to form a ceramic support structure, wherein following the shaping step, the sample is cooled below the fluid state transition temperature before the de-binding and sintering steps are performed; and coating a surface of the ceramic support structure with one or more catalytic compounds, wherein the injection mold is provided with a number of pins extending across the internal space of the mold such that the formed catalyst obtains a number of through-going internal channels to obtain a voidage fraction ranging from 30% up to 90%.

27. The method according to claim 26, wherein:

a dimension and physical design of internal walls defining the internal space of the injection mold are designed to form ceramic catalysts which are comparable in size and shape as present monoliths.

* * * * *